UNITED STATES PATENT OFFICE.

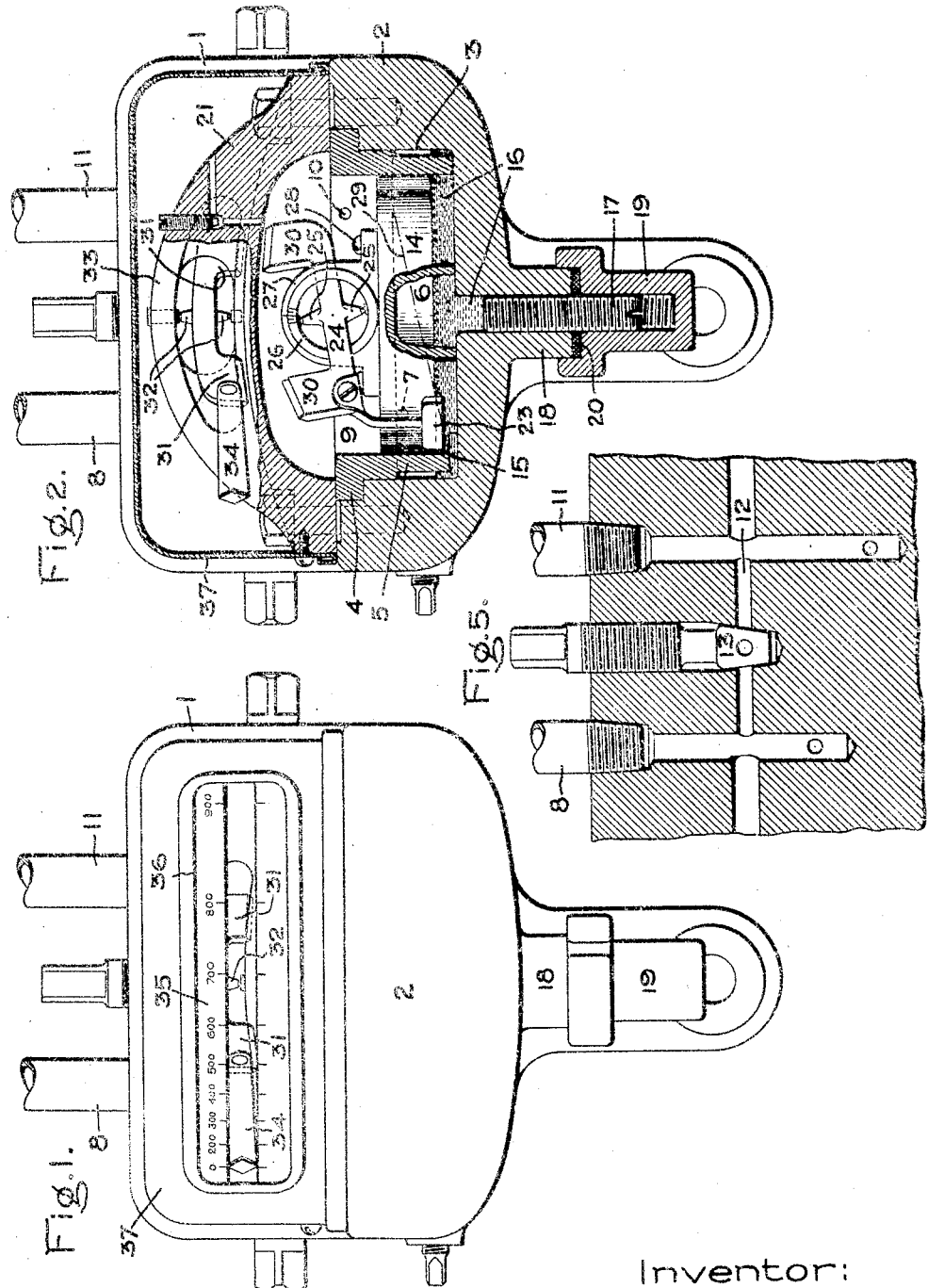

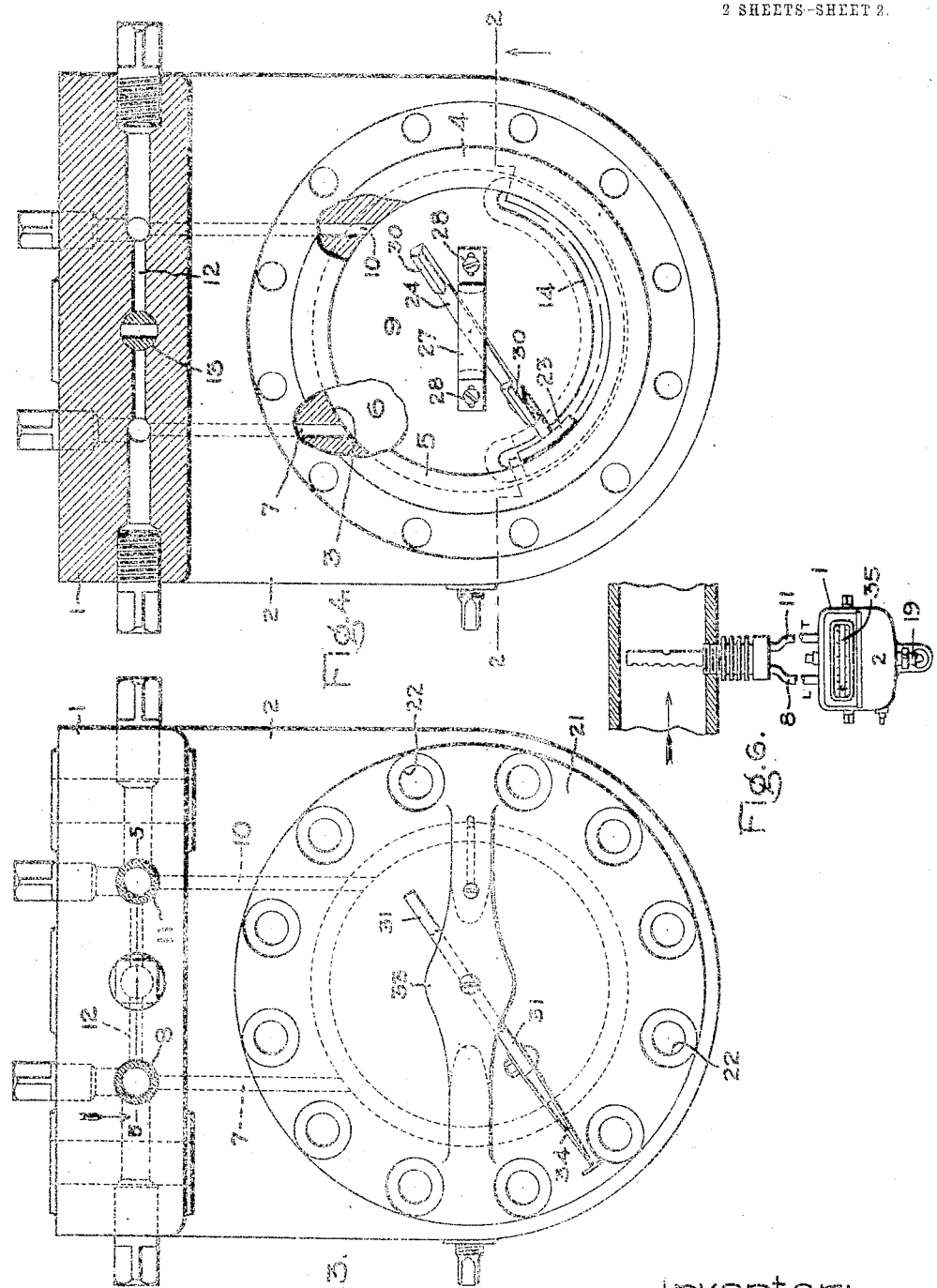

JAMES WILKINSON, OF BOSTON, MASSACHUSETTS, ASSIGNOR TO GENERAL ELECTRIC COMPANY, A CORPORATION OF NEW YORK.

FLUID-FLOW METER.

1,080,396.   Specification of Letters Patent.   Patented Dec. 2, 1913.

Application filed June 21, 1912. Serial No. 705,000.

*To all whom it may concern:*

Be it known that I, JAMES WILKINSON, a citizen of the United States, residing at Boston, county of Suffolk, State of Massachusetts, have invented certain new and useful Improvements in Fluid-Flow Meters, of which the following is a specification.

This invention relates to apparatus for measuring the flow of fluid through a main, and its object is to provide a convenient device wherein the quantity of fluid passing at any given instant can be read from a scale of considerable amplitude; the construction being such that small changes in flow are readily shown on said scale.

The invention is of especial value where the fluid flow is relatively small and the velocity relatively low.

The invention consists of a mercury chamber containing a float which is caused to rise and fall by variations in the flow and is connected to mechanism for amplifying its movements so that an index will sweep over a wide range of graduations on a scale. The float is connected to a lever pivoted on an oblique axis, so that as the float rises and falls it also turns said lever on its axis. A magnet is mounted on or made a part of said lever, and this in turn controls the movements of a freely pivoted magnet adjacent to but outside of the mercury chamber, by whose movements an index is made to oscillate over a graduated scale.

In the accompanying drawings, Figure 1 is a front elevation of my improved meter; Fig. 2 is an upright section thereof on the line 2—2 of Fig. 4; Fig. 3 is a top plan view; Fig. 4 is a similar view partly in horizontal section; Fig. 5 shows some of the passages and a controlling valve; and Fig. 6 shows on a small scale one mode of connecting the meter to the main through which flows the fluid to be metered.

The meter has an upright back 1, from which projects forward a suitable body 2 in which is formed a reservoir or recess 3. For convenience, this recess is circular in horizontal cross section and its upper edge is preferably rabbeted to receive a flange 4 on a cylindrical block 5 which closes the upper part of the recess, so as to leave a chamber 6 in the lower portion of said recess which communicates by a passage 7 with a pipe 8 secured to the upper part of the back 1, and connected with the leading orifices in a Pitot tube or other device for producing a pressure in said chamber that bears a definite relation to the rate of flow. The block is preferably counterbored, the counterbore forming part of a chamber 9 which is connected by a passage 10 with a pipe 11 secured to said back and connected with the trailing orifices in the Pitot tube or other pressure difference device. A bypass 12, controlled by a stop valve 13, connects these two passages in the back 1, as shown in Fig. 5. Following one wall of the counterbore in the block is a nearly semi-circular slot 14 extending through the bottom of the block and connected at its bottom by a passage 15 in the walls of said slot with the annular chamber 6. The walls of the slot extend from the bottom wall of the block to the bottom of the recess except for the portion cut away to form the passage 15.

A quantity of mercury 16 partially fills the chamber 6 and the slot 14. The normal level of the mercury can be regulated by a screw-threaded plunger 17 working in a hole in a boss 18 on the under side of the body 2, and locked by a cap nut 19 screwed upon the end of said plunger against a gasket 20.

A dome-shaped head 21 covers the block 5 and clamps its flange 4, as shown in Fig. 2, being secured to the body 2 by screws inserted through the holes 22. This head, taken with the counterbore in the block and the slot 14 extending downwardly therefrom, forms a chamber to coöperate with the communicating chamber 6, the two chambers and the mercury 16 functioning as the U-shaped metering tube commonly used in instruments of this kind.

A float 23 rests upon the mercury in the slot 14 and is connected to a lever 24 provided with trunnions 25 which are mounted preferably in jeweled bearings in a ring 26. A strap 27 holds this ring, so that said ring can be angularly adjusted if necessary. The strap has feet provided with slots to receive the screws 28, so that it can be adjusted longitudinally on the bottom of the counterbore in the block 5.

The axis of the trunnions 25 is slightly oblique to the vertical, as shown in Fig. 2, and intersects the vertical axis of the concentric chambers, so that as the float rises and falls it will also travel along the slot 14, following the path indicated by the inclined dotted line 29. In consequence of this arrangement a large angular deflection of the lever is obtained for a very slight change in the level of the mercury in the slot 14. The ratio of horizontal to vertical movement of the float can be adjusted by turning the ring in its strap. In the drawing, this ratio is about 12 to 1.

In order to communicate the movements of the lever to an indicating device outside of the head 21, I prefer to make said lever in the form of a U-shaped permanent magnet, with upwardly projecting poles 30, which coöperate with the downwardly projecting poles 31 of a second permanent magnet mounted on vertical trunnions 32 which are journaled preferably in jeweled bearings in the top of the dome and in a bridge or yoke 33 supported thereby. The dome-shaped head 21 and its yoke are of course composed of non-magnetic material.

The upper magnet carries an index 34 of any suitable construction, which sweeps over a graduated scale 35 arranged behind a glazed opening 36 in a sheet metal cover 37 which houses the dome-shaped head 21.

This meter is simple and is composed of comparatively few parts which are of a rugged nature and will not get out of order easily. It is of especial advantage in cases where the fluid consumption is light and the velocity of flow is comparatively low. It can be used with any kind of pressure-difference device, either a Pitot tube or a Venturi tube or nozzle or even by tapping the steam main at two points sufficiently separated to produce a drop in pressure; preferably at points on opposite sides of an elbow to get a greater drop.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. A meter for measuring pressure differences, comprising a mass of mercury, a container therefor so constructed that the pressure differences will cause the rise and fall of the mercury, a float supported by said mercury, a lever connected to said float and journaled on an axis oblique to the vertical, and means for indicating the movements of said lever.

2. A meter for measuring pressure differences, comprising a structure containing two chambers communicating at the bottom, a mass of mercury in said chambers, a float in one of said chambers supported by said mercury, a lever connected to said float and journaled on an axis oblique to the vertical, and means for indicating the movements of said lever.

3. A meter for measuring pressure differences, comprising a body containing a recess, a block dividing said recess into two chambers communicating at the bottom, a mass of mercury in said chambers, a float in one of them supported by said mercury, a lever journaled on an axis oblique to the vertical and connected to said float, and means for visually indicating the movements of said lever.

4. A meter for measuring pressure differences, comprising a body containing a circular recess, a block dividing said recess into inner and outer chambers communicating at the bottom, a mass of mercury in said chambers, a float in the inner chamber supported by said mercury, a lever connected to said float and mounted on an axis oblique to the vertical, and means for visually indicating the movements of said lever.

5. A meter for measuring pressure differences, comprising a body containing a circular recess, a block dividing said recess into inner and outer chambers communicating at the bottom, a mass of mercury in said chambers, a float in the inner chamber supported by said mercury, a lever connected to said float and mounted on an axis which is oblique to the vertical and intersects the vertical axis of said chambers, and means for indicating the movements of said lever.

6. A meter for measuring pressure differences, comprising a body containing a recess, a block dividing said recess into inner and outer chambers communicating at the bottom, a mass of mercury in said chambers, a float supported by the mercury in the inner chamber, a magnet connected to said float and journaled on an axis oblique to the vertical and intersecting the vertical axis of said chambers, a head inclosing said magnet, and a coöperating magnet outside of said head for indicating the movements of the inner magnet.

7. A meter for measuring pressure differences, comprising a body having a circular recess, a cylindrical block seated in said recess and having its lower portion of less diameter than the upper and provided with a counterbore in its upper end and a nearly semi-circular slot extending from said counterbore through the bottom of said block, and a dome-shaped head of non-magnetic material clamping said block.

8. A meter for measuring pressure differences, comprising a body having a circular recess, a block seated in said recess and dividing it into two chambers, a strap secured to the upper portion of said block, a ring angularly adjustable in said strap, bearings in said ring, and a lever journaled in said bearings and carrying a float located in one of said chambers.

9. A meter for measuring pressure differences, comprising a mass of mercury, a container therefor so constructed that the pressure differences will cause the rise and fall of the mercury, a float partly submerged in said mercury and supported on an axis oblique to the vertical, and means for indicating the movements of said float.

10. A meter for measuring pressure differences, comprising a mass of mercury, a container therefor so constructed that the pressure differences will cause the rise and fall of the mercury, a float partly submerged in said mercury and supported on an axis oblique to the vertical, a magnet connected to said float, a head inclosing said magnet, and a coöperating magnet outside of said head for indicating the movements of the inner magnet.

In witness whereof, I have hereunto set my hand this 19th day of June, 1912.

JAMES WILKINSON.

Witnesses:
 FRANK E. WILSON,
 N. L. GANNON.